C. BIRAULT.
APPARATUS FOR THE PRODUCTION OF GAS FROM SEWAGE.
APPLICATION FILED AUG. 15, 1912.

1,080,808.

Patented Dec. 9, 1913.

4 SHEETS—SHEET 1.

Witnesses:
T. T. Wentworth
Eugene Wening

Inventor
Camille Birault
by his Attorney

C. BIRAULT.
APPARATUS FOR THE PRODUCTION OF GAS FROM SEWAGE.
APPLICATION FILED AUG. 15, 1912.

1,080,808.

Patented Dec. 9, 1913.
4 SHEETS—SHEET 3.

C. BIRAULT.
APPARATUS FOR THE PRODUCTION OF GAS FROM SEWAGE.
APPLICATION FILED AUG. 15, 1912.

1,080,808.

Patented Dec. 9, 1913.
4 SHEETS—SHEET 4.

Witnesses:
F. T. Wentworth
Eugene Wening

Inventor
Camille Birault
by (attorney)
his Attorney

UNITED STATES PATENT OFFICE.

CAMILLE BIRAULT, OF PARIS, FRANCE.

APPARATUS FOR THE PRODUCTION OF GAS FROM SEWAGE.

1,080,808.  Specification of Letters Patent.  Patented Dec. 9, 1913.

Application filed August 15, 1912. Serial No. 715,157.

*To all whom it may concern:*

Be it known that I, CAMILLE BIRAULT, a citizen of the Republic of France, residing at 4 Rue Mariotte, in Paris, France, have invented certain new and useful Improvements in Apparatus for the Production of Gas from Sewage, of which the following is a specification.

My invention relates to an improved apparatus for the destruction, by incineration, of sewage and refuse, whereby I am enabled to cheaply and efficiently produce carbon-monoxid gas.

According to the present invention the refuse which may be absolutely crude without any previous sifting, is incinerated at a low temperature (a temperature below the melting point of glass or about 800° centigrade). The combustion is carried out on rocking grates with vertical and horizontal combined reciprocating movements, to which are preferably added periodic jolts. Moreover the grates have their bars very widely spaced (by several centimeters) so that under the action of the movements given to the grate, the major part of the non-combustible matters such as pieces of earthenware, metal and glass passes between the bars and through the grate so as to drop along with the ashes. Lastly there is a space all around the grates, and the space between the edge of the grate and the wall is very considerable at one of the ends of the grate. Under the action of the jolts the non-combustible matters too bulky to pass between the bars are thrown toward this end of the grate where they pass through the space between the grate and the wall, and they drop into the ash-pit along with the non-combustible matters and the ashes which have passed between the bars.

The accompanying drawings illustrate a group of cells of a sewage destructor according to the invention.

Figure 1:
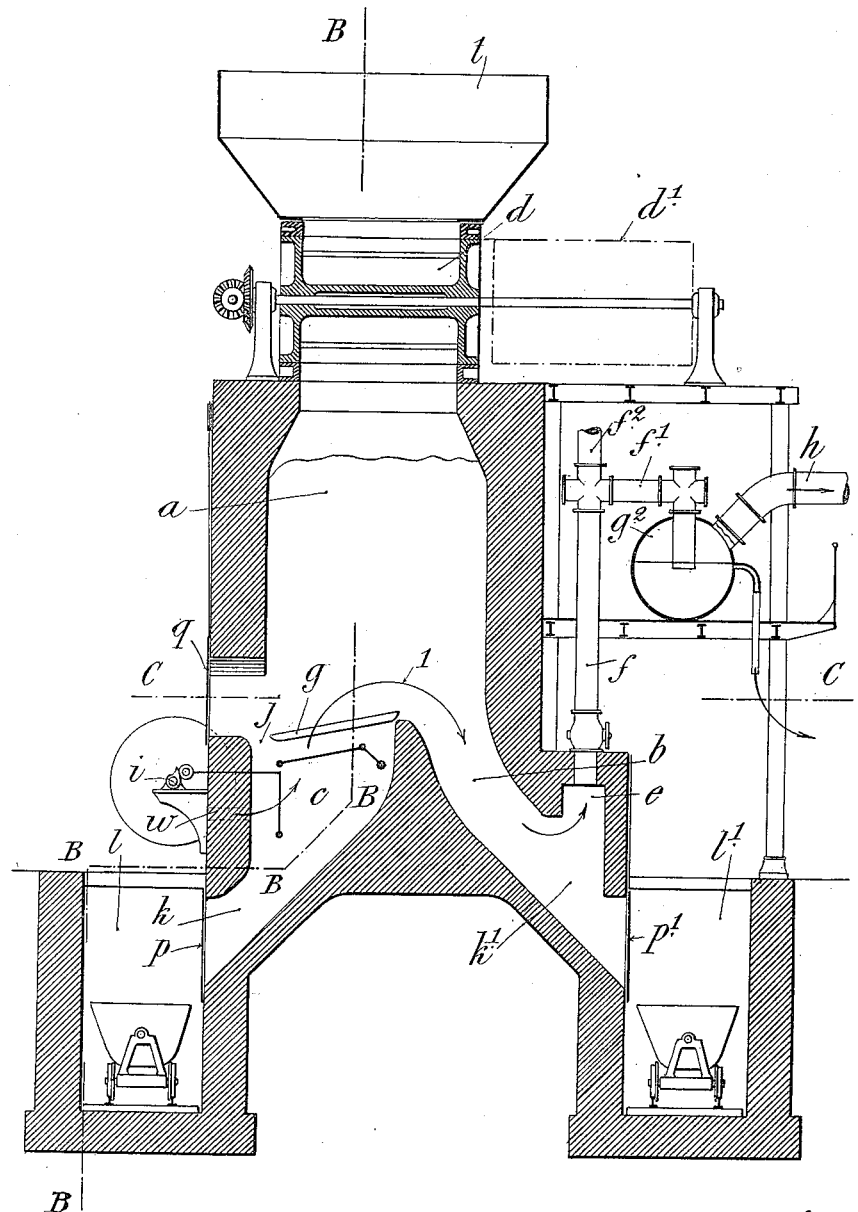
Figure 2:
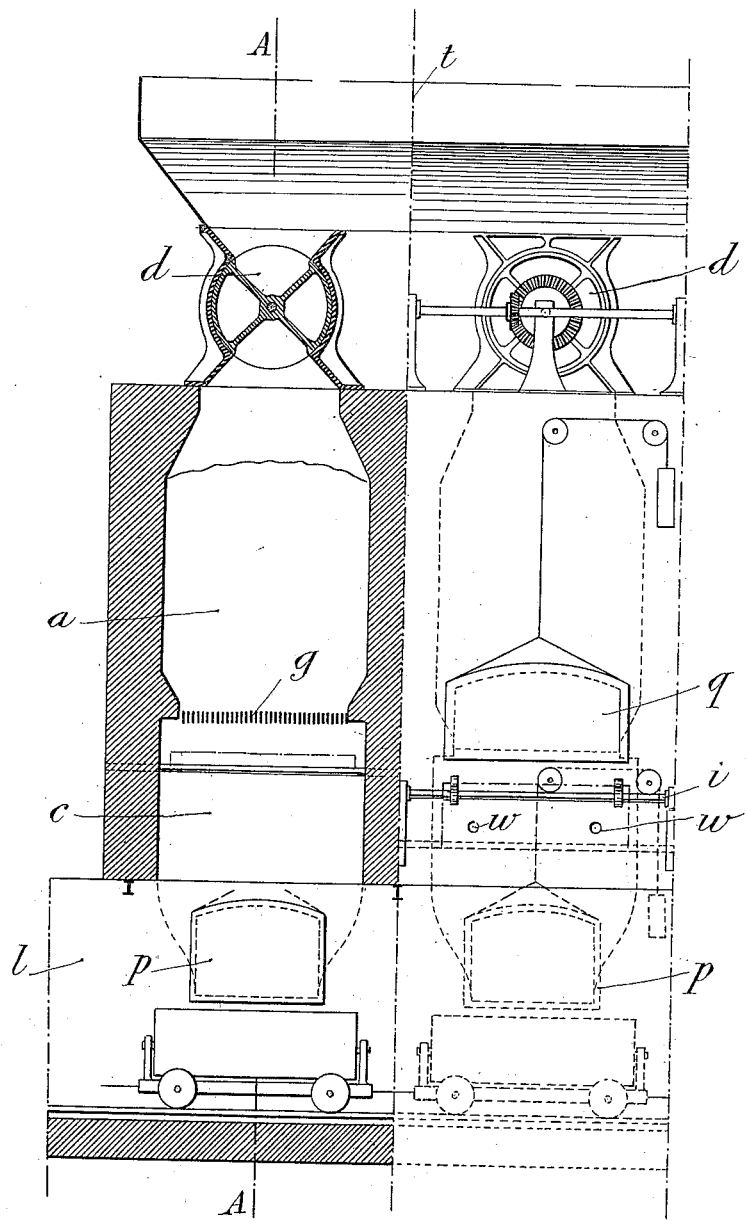
Figure 3:
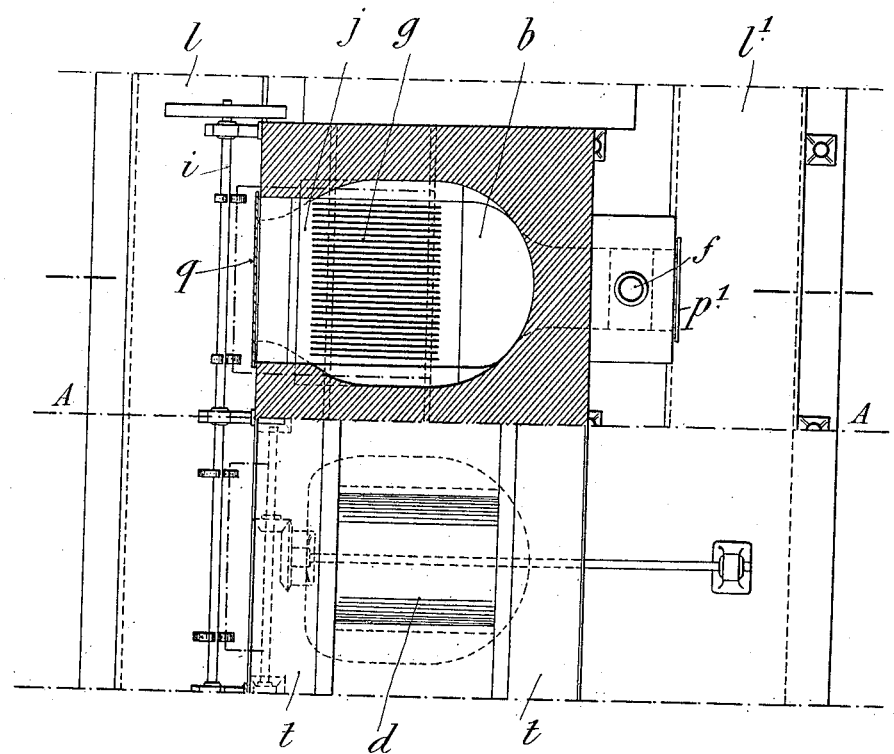
Figure 4:
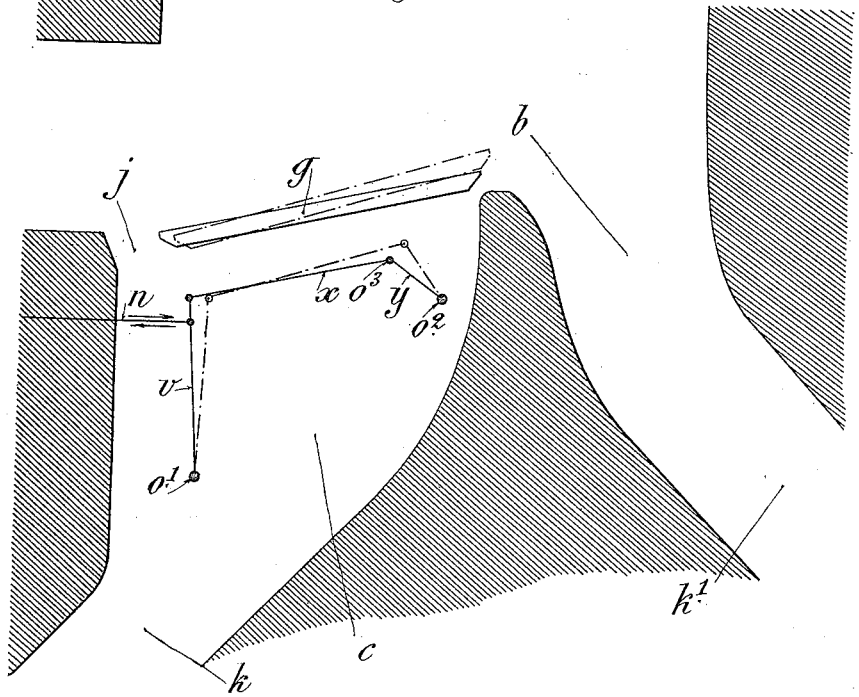
Figure 5:
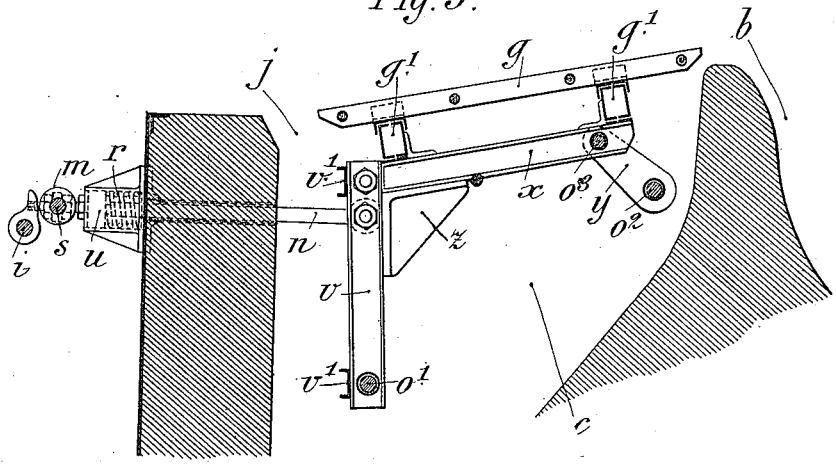

Figure 1 is a vertical section through a cell at the line A—A of Figs. 2 and 3. Fig. 2 is a section through a cell at the line B—B of Fig. 1 and an elevation of the adjacent cell. Fig. 3 is a horizontal section of a cell at the line C—C of Fig. 1 and a plan of the adjacent cell. Fig. 4 is a diagrammatic view of the mechanism of the rocking grate. Fig. 5 shows the details of this mechanism.

Figs. 1, 2 and 3 show that a cell consists in principle of a vertical receiver $a$; near the bottom of this receiver is a rocking grate $g$ occupying in plan only a part of the horizontal sectional area of the receiver $a$. The rest of this section is occupied by a wide pit $b$, the upper inlet of which is vertical, and which continues as a sloping chute.

The refuse supplied to an upper hopper $t$ is emptied continuously into the receiver $a$ by means of a distributer $d$. The chamber $a$, above a grate $g$ therein, is practically entirely filled with the refuse to be incinerated.

The admission of the air required for the combustion is made in the ash-box $c$ through nozzles $w$. This air is admitted underneath the grate and penetrates the mass of burning material constituted by the lower part of the charge of refuse supported by the grate $g$. In the vicinity of the grate the gases of combustion pass nearly horizontally (in the direction of the arrow 1) through the mass of refuse, then they flow downward through the pit $b$ and the refuse which is present in this region, which they distil under the action of their sensible heat. These gases arrive at $e$ whence they flow through ducts $f$, $f'$ into a drum $g^2$. In this drum the waters of condensation collect. From here the gases flow through a duct $h$ to the washing and purifying devices whence they issue to be directly utilized in motors, gas furnaces, etc., or to be stored in a gas-holder. The admission of air through the nozzles $w$ and the movements of the gases are determined by injection of air under pressure through the nozzles, or by suction at the issue of the gases from the apparatus. The principle of working of the apparatus is the same in the two cases.

The grate $g$ has a rocking movement with jolts such as will be explained hereinafter; these movements are obtained by a cam shaft $i$. Under this shaking action the cinders and the major part of the non-combustible matters such as pieces of earthenware, metal and glass, pass between the bars, through the grate, and drop into the ash-pit $c$. The non-combustible matters too bulky to pass between the bars are urged by the shaking toward the gap $j$ between the end of the grate and the wall, through which these matters also drop into the ash-pit $c$. It is only necessary to raise doors $p$ (Figs. 1 and 2) in order that all the non-combustible matters collected in the ash-pit $c$, shall pass directly down an inclined chute $k$ into trucks on rails at the bottom of a covered trench $l$ for the removal of the ashes. At the same time at the lower part of the pit $b$ the refuse is completely consumed and descends continuously under the action of gravity owing to the vertical arrangement of the opening of the pit. The inclined chute $k'$ which is in extension of the pit is thus full of ashes and non-combustible matters. When the door $p'$ is raised these matters pass directly into the trucks, in the trench $l'$. Upper doors $q$ (Figs. 1 and 2) are provided above the level of the grate to give ready access to the receiver for inspection, upkeep and repair. For the same reason, the distributer $d$ shown in the drawings is rotary, and the drum can if necessary be shifted longitudinally to $d'$ (Fig. 1) to completely free the inlet of the receptacle $a$, so as to facilitate upkeep and repairs. The doors $p$ and $p'$ are vertically slidable in guides (not shown) secured to the masonry adjacent the doors.

Any suitable grate may be employed in my improved furnace, the preferred form being shown diagrammatically in Fig. 4 and in detail in Fig. 5. The grate $g$ is supported through the medium of transverse beams $g'$ on connecting rods $x$. These rods are supported at the front side of the destructor by rods $v$ which are more or less vertical; they are supported near the back by inclined rods $y$. The rods $v$ and $y$ can rock about lower fulcrums $o', o^2$ consisting of transverse shafts fixed in the masonry. The three rods $v, x$ and $y$ jointed together constitute a link system and the grate $g$ receives the same movements as the upper connecting rods $x$. The rocking movements are caused by the axial movements of thrust rods $n$ jointed to the front rods $v$. The thrust rods are guided by means of pistons $u$ working in fixed outer cylinders. The thrust rods of one grate are connected together by a cross-rod $s$ on which are mounted rollers $m$ disposed to the right of the cams of the driving shaft $i$. The rotation of this shaft causes at each passage of the cams to the right of the rollers an abrupt thrust of small amplitude of the thrust rods $n$. The back of the grate lifts, while the front of the same receives a more or less horizontal movement, so that the grate moves from the full line position into the position indicated in chain dotted lines (Fig. 4). When the cams disengage from the rollers, the grate drops abruptly into its initial position owing to its weight, and the weight of the mechanism and charge of refuse on the grate. This movement is arrested by a jolt which is produced when the bracket $z$ fixed on one of the rods $x$ or $v$ is blocked against the other rod, thus suddenly limiting the return movement of the mechanism and of the grate. The intensity of the shock is regulated by springs $r$ which are more or less compressed at the end of the travel, according to the position of the pistons $u$ on the outer screw-threaded ends of the thrust rods $n$.

The amplitude of the oscillations of the grate are regulated by the position of the roller cross bar $s$ relatively to the threaded ends of the thrust rods. Simple adjustments of nuts on the thrust rods thus allow the intensity of the shocks and the amplitudes of the oscillation of the grate to be adjusted. The lower fulcrum shafts $o', o^2$ of the mechanism are shown incased in protecting tubes and also the upper shaft $o^3$ connecting the back rods $y$. The front rods $v$ are interconnected by the upper and lower thrust bars $v'$.

The movement of the grate $g$ effected by the hereinbefore described mechanism is devised with a view to give the maximum useful effect as regards the elimination of ashes and non-combustible matters in the interior of the burning mass of refuse. The jolts have at the same time a vertical and a horizontal component which facilitates the passage between the bars of materials of very irregular shape which finally assume the proper position for dropping between the bars. The matters too bulky to pass between the bars are urged toward the gap $j$ and drop into the ash-box. The combustion is most intense near the upper end of the grate at the side of the pit $b$. It is therefore this back end of the grate which receives the vertical oscillations of greatest amplitude, in order to effect a more abundant discharge of ashes and non-combustible matters, from this zone of the grate. The sewage and refuse above the incline chute $k'$ are carbonized and heated to a red heat, so that the gases (mainly carbonic acid) which pass therethrough from the grate as the latter is oscillated, are reduced by contact with the carbonized material and converted into combustible gas, such as carbon monoxid. The fuel above the chute $k'$ is, naturally, not as directly and thoroughly agitated as the material on and above the grate, but such material is, nevertheless, acted upon to some extent and is constantly caused to pass down the chute $k'$ by the movements imparted to the grate. The vertical rocking movements communicated to the refuse adjacent in the pit $b$, beyond the grate, also facilitate the sliding and the dropping of the ashes and non-combustible matters toward the back wall of the fire bridge; these matters gradually slide toward the discharge duct $k'$. At the front of the grate $g$ on the contrary the horizontal rocking of the grate should be the most prominent in order to cause the bulky non-combustible matters which have not passed between the bars of the grate, to descend toward the gap $j$. The rise of the grate is rapid and its descent is more so, and ends with a jolt, a condition which is very favorable for the acceleration of the drop of the ashes and non-combustible matters. The movements thus combined are therefore systematic and correspond to the varying intensity of combustion in the different zones of the grate. The amplitudes of the oscillations and the intensity of the jolts are adjustable as has been already stated, according to the nature of the refuse under treatment.

The advantages of the described apparatus are the following:

(a) All the non-combustible matters and the ashes which are the residue of the incineration of the combustible matters, are continuously eliminated from the burning mass during the incineration of the refuse. Owing to this continuous elimination there is no formation of clinkers; the elimination goes on without stoppage, and without interference with the progress of the combustion, and the destructors are in continuous operation.

(b) The gases produced are combustible at their issue from the apparatus. The forms adopted for the incineration chambers, the arrangement of the masses of material treated the regulation of the air of combustion allow of yielding combustible gases capable of industrial use. These gases can be used in gas engines, thus rendering available a considerable amount of energy much greater than that which can be obtained with steam boilers. These combustible gases can also be burnt in gas furnaces or used directly for other industrial purposes.

(c) Independently of the gases utilizable in the manner stated, the waters of condensation and in which the gases are washed contain ammonia. The ashes are also capable of being used in the manufacture of cements, bricks, or as agricultural fertilizers.

(d) The comparatively low temperature at which the combustion takes place allows refractory linings to be used to a much smaller extent in the construction of the destructors. The masonry may be for the most part composed of bricks of ordinary quality. No special arrangement has to be provided for the cooling of the fire bars.

(e) The output of the grates is a maximum, the whole of their area being in constant use owing to the removal of the clinkers and the continuous elimination of the ashes without stoppage or interruption in the progress of the combustion. The wide spacing of the bars also gives abundant access of air for combustion. These different conditions thus render possible the attainment of a considerable mean daily output of the destructors.

What I claim is:—

1. A sewage destructor, embodying therein a vertical cell having a relatively short vertical partition at its base whereby the base of said cell is divided into two opposite compartments, a grate in said cell, means whereby said grate is supported over one of said compartments only with one end of the grate spaced away from said partition and its other end spaced away from one of the side walls of said cell, means whereby the material to be treated is fed onto said grate and into the compartment adjacent that over which the grate is supported, and means whereby combustion of the material on the grate is effected and the gases of combustion are passed through the material in the compartment adjacent that over which the grate is supported.

2. A sewage destructor, embodying therein a vertical cell unobstructed throughout the greater part of its length and provided with a relatively short vertical partition at its base dividing the latter into two parallel inclined compartments, a grate having widely spaced grate bars positioned over one of said compartments whereby the gases of combustion from material on said grate pass through the material in the adjacent compartment, means for supporting said grate in an inclined position with its higher end adjacent the top of said partition and there being a gap between the lower end of said grate and the adjacent cell wall, there being a feed opening at one end of said cell through which material to be treated may be fed simultaneously onto said grate and into the compartment adjacent thereto, means for intermittently oscillating said grate vertically and horizontally, and means for abruptly terminating said oscillations whereby said grate is subjected to periodical jolts and shocks.

In testimony whereof I have affixed my signature in presence of two witnesses.

CAMILLE BIRAULT.

Witnesses:
LOUIS FAUTRAT,
H. C. COXE.

Copies of this patent may be obtained for five cents each, by addressing the "Commissioner of Patents, Washington, D. C."